United States Patent [19]

Biber et al.

[11] 4,182,563

[45] Jan. 8, 1980

[54] FOCUS CONTROL SYSTEM FOR INTERCHANGEABLE ADJUSTABLE FOCUS LENSES

[75] Inventors: Conrad H. Biber, Needham; Edwin K. Shenk, Westford; Shirley Y. Tam, Arlington, all of Mass.

[73] Assignee: Polaroid Corporation, Cambridge, Mass.

[21] Appl. No.: 898,107

[22] Filed: Apr. 20, 1978

[51] Int. Cl.² ............................................. G03B 13/22
[52] U.S. Cl. ................................................... 354/197
[58] Field of Search ................. 354/25, 163, 167, 195, 354/197; 352/140, 142; 250/201, 204; 355/55, 56

[56] References Cited

U.S. PATENT DOCUMENTS

| 2,926,579 | 3/1960 | Gebele | 354/198 |
| 3,522,764 | 8/1970 | Biber | 354/195 |
| 3,882,520 | 5/1975 | Kamp et al. | 354/197 |
| 3,935,581 | 1/1976 | Starp | 354/270 |
| 3,958,117 | 5/1976 | Stauffer | 250/201 |

Primary Examiner—L. T. Hix
Assistant Examiner—William B. Perkey
Attorney, Agent, or Firm—John J. Kelleher

[57] ABSTRACT

A camera having an automatic focus control system for an adjustable focus lens is provided with a demountable adjustable or fixed focus lens that incorporates a device having an adjustable or fixed focus lens characteristic that causes said automatic focus control system to vary in accordance with said lens characteristic. The device is removable with the lens and means are provided for interconnecting said device with said control system when the lens is mounted on said camera.

20 Claims, 10 Drawing Figures

FOCUS CONTROL SYSTEM FOR INTERCHANGEABLE ADJUSTABLE FOCUS LENSES

BACKGROUND OF THE INVENTION

1. Field of the Invention

The present invention relates to automatic focusing photographic cameras in general, and to control systems for positioning the adjustable focus lens in such cameras, in particular.

2. Description of the Prior Art

Photographic cameras having interchangeable fixed and/or adjustable focus lenses are well known in the prior art. Cameras having an adjustable focus lens and having a focus control system coupled to said lens for automatically focusing image forming light rays from a remote object at the film plane of such a camera in response to a rangefinder derived signal representative of the actual distance between said camera and said remote object, are also known in the prior art. A camera having such a focus control system and utilizing acoustical energy to determine the distance to a remote object is described in U.S. Pat. No. 3,522,764 to BIBER et al.

In an adjustable focus lens, there is a well understood nonlinear relationship between the axial position of the movable element in such a lens where a subject to be photographed is in focus at a particular image plane, and the distance from such a subject to said adjustable focus lens. When designing an automatic focus control system for an adjustable focus lens camera such as that described in the above-mentioned BIBER et al. patent, consideration must be given to this nonlinear relationship. If the adjustable focus lens of such a camera is replaced with another adjustable focus lens without due regard for the lens position/subject distance relationship of said replacing lens, misfocusing of said replacing lens will result if there is a significant difference between the lens/subject function of the replaced lens and the lens/subject function of the replacing lens.

In order to be able to interchange one adjustable focus lens in an automatic focusing camera of the type described above, with a different adjustable focus lens having a significantly different lens/subject function as discussed above, the control system of said camera must be readily modifiable such that it is capable of positioning said different adjustable focus lens with its significantly different lens/subject function to the correct subject-in-focus position. If a fixed focus lens is to be combined with an existing adjustable focus lens in an automatic focusing camera as when a fixed focus telephoto lens is optically coupled to an adjustable focus lens, means must be provided for readily scaling up or scaling down the magnitude of the lens/subject function of said adjustable focus lens to compensate for the magnification provided by said fixed focus lens.

SUMMARY OF THE INVENTION

In accordance with the teachings of the present invention, a photographic camera having an automatic focus control system is provided with a demountable adjustable focus or fixed focus lens that incorporates a device that includes an adjustable or fixed focus lens characteristic that causes said automatic focus control system to vary in accordance with said lens characteristic. In another embodiment of the present invention, a plurality of such devices are mounted in the housing of said camera and the appropriate lens characteristic including device is selected by attaching a particular fixed or adjustable focus lens to said camera.

DESCRIPTION OF THE PREFERRED EMBODIMENTS

Figure 1:
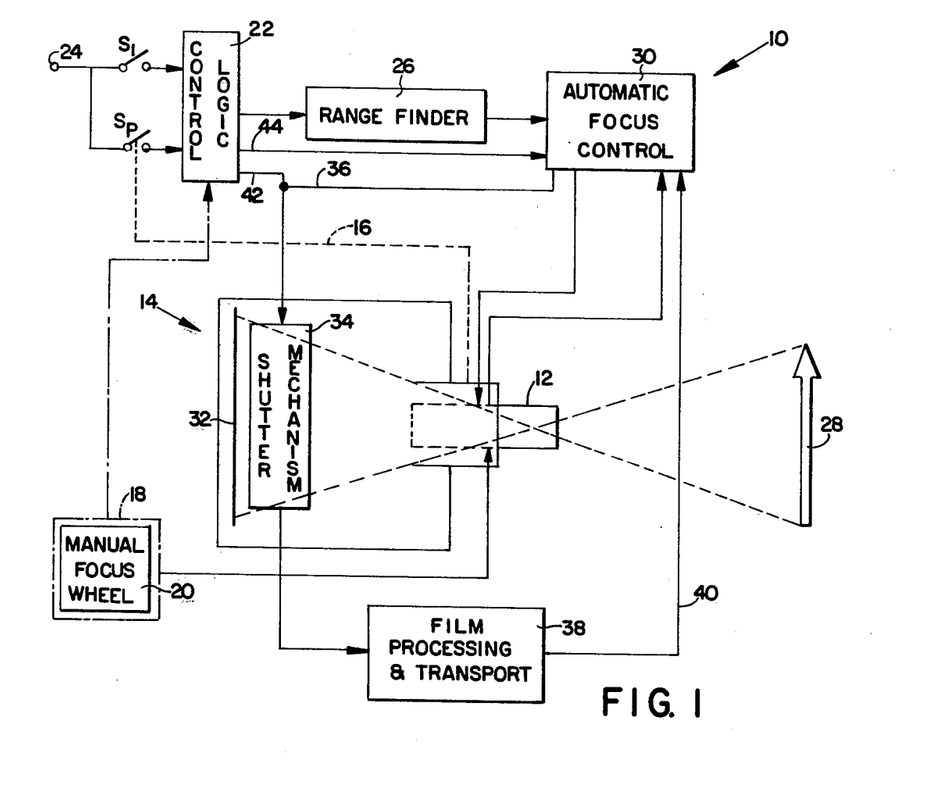
FIG. 1 is a functional block diagram of an adjustable focus lens camera having both manual and automatic lens focus controls.

Referring now to the drawings and, specifically to FIG. 1, a schematic diagram of manual and automatic focus control system 10 for adjustable focus lens 12, of self-processing camera 14, is depicted. The automatic focus control portion of control system 10 is described in some detail in U.S. patent applications Ser. Nos. 729,289 now abandoned and 865,852 now abandoned by SHENK and, for convenience, the specifications in said SHENK applications are specifically incorporated herein. In order to automatically focus adjustable focus lens 12, switch $S_1$ must be actuated to its fully closed position. Automatic focusing will be initiated by the closure of switch $S_1$ if lens actuated switch $S_p$, which is coupled to adjustable focus lens 12 through mechanical linkage 16, has been actuated to its open position by lens 12 movement, and if displaceable barrier or shroud 18 is positioned such that it both precludes manual access to manual focus wheel 20 and enables control logic 22. If switch $S_1$ is actuated to its closed position under these conditions, a source of power (not shown) which is connected to terminal 24 will, in turn, be coupled to the input of rangefinder 26 through control logic 22 thereby activating said rangefinder 26. When so activated, rangefinder 26 acoustically determines the distance to a subject to be photographed such as subject 28. A more detailed explanation of how rangefinder 26 determines the distance to a remote object is contained in the above-referenced SHENK applicatons. When the distance to subject 28 has been determined, rangefinder 26 causes automatic focus control 30 to transmit a lens element positioning force to adjustable focus lens 12 causing said lens 12 to form an in-focus image of subject 28 at film plane 32 of said camera 14 when shutter mechanism 34 has been actuated to its open position by a signal from automatic focus control 30 through path 36. As mentioned above, camera 14 is of the self-processing type and therefore once the actuation of shutter mechanism 34 is complete, film processing and transport cycle 38 is initiated. This event initiates film processing and film movement out of said camera 14. If switch $S_1$ is in its open position when film processing and transport complete signal 40 is transmitted to automatic focus control 30, said automatic focus control 30 will cause the movable element of adjustable focus lens 12 to be driven to the point where lens movement actuated switch $S_p$ is actuated to its open position through said mechanical linkage 16.

To manually focus adjustable focus lens 12, displaceable barrier or shroud 18, which precludes manual access to focus wheel 20 during automatic focus, is manually positioned to its displaced position so that said manual focus wheel 20 can be actuated by a camera 14 operator. When shroud 18 is so displaced, said displacement configures control logic 22 such that rangefinder 26 is disabled. Shutter mechanism 34 may be actuated, for picture taking purposes, by manually actuating switch $S_1$ to its closed position which will cause a shutter actuating signal to be sent to shutter mechanism 34 through path 42. Such shutter actuation would normally occur after focusing is complete. When shutter mechanism 34 has been fully actuated, film processing and transport cycle 38 is then automatically initiated.

In order to return the focus control system to its automatic mode, shroud 18 is repositioned over manual focus wheel 20, said repositioning causing control logic 22 to enable rangefinder 26. If lens actuated switch $S_p$ was actuated to and left in its closed position by the manual movement of adjustable focus lens 12 by manual focus wheel 20, automatic focus control 30 will sense said switch $S_p$ closure through path 44 when said shroud 18 is repositioned over manual focus wheel 20, and will cause said adjustable focus lens 12 to be driven until switch $S_p$, which is mechanically coupled to adjustable focus lens 12 through linkage 16, is actuated to its open position by adjustable focus lens 12 movement. The proper operation of control system 10 is, among other things, dependent upon the relationship between the axial position of the movable element of said adjustable focus lens 12, where a subject to be photographed is in focus at image plane 32, and the distance from said subject to said adjustable focus lens 12. This relationship is graphically depicted in FIG. 2.

Figure 2:
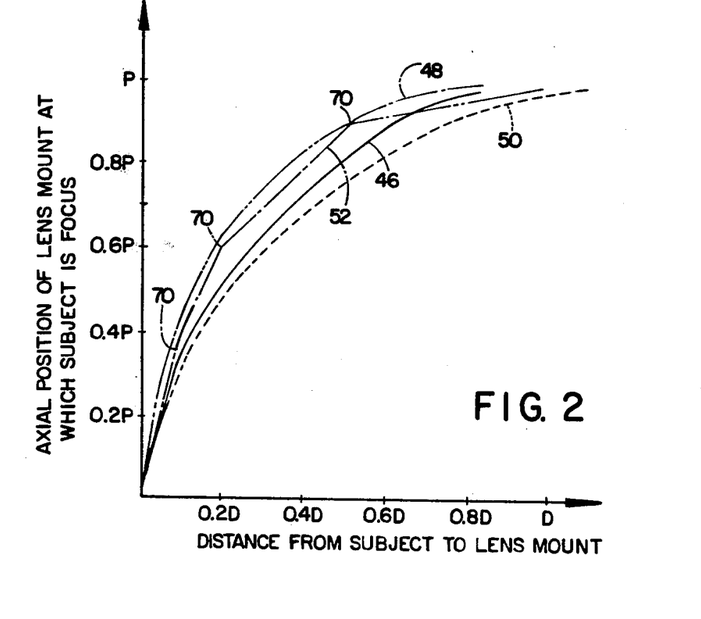
FIG. 2 is a normalized graph of a typical lens position/subject distance function of an adjustable focus lens such as that functionally depicted in FIG. 1.

In FIG. 2, a typical lens/subject function is illustrated by curve 46 where the ordinate and abscissa units are normalized for convenience. It should be understood that curve 46 is intended to represent the general shape of a typical lens/subject function and is not drawn to scale. As can be seen from curve 46 in FIG. 2, the relationship between the axial position of the movable element of adjustable focus lens 12 at which a subject is in focus and the distance from said subject to said movable lens 12 element, is highly nonlinear. It is well known that if an adjustable focus lens is misfocused, such misfocus cannot readily be detected by the human eye so long as the degree of misfocus stays within what is often referred to as an acceptable blur circle or an acceptable circle of confusion of said lens. Curves 48 and 50, which have the same general shape as curve 46, represent the outer limits of the circle of confusion of lens/subject function or curve 46. As a consequence of the existance of curves 48 and 50, in a given optical system, actual lens/subject function 46 can be approximated by a piecewise linear curve 52. As long as this piecewise linear curve fits within the envelope defined by curves 48 and 50, a subject is said to be "in focus" since the lens position and subject distance intersect within said curves 48 and 50 envelope. As described in much greater detail in the abovementioned SHENK applications, the lens/subject function represented by curve 52 affects the positioning of adjustable focus lens 12 in FIG. 1 by utilizing the derivative or the slope of said curve 52 to vary the output from a pulse generator. The output of said pulse generator is routed into a counter during the time interval that corresponds to the distance to subject 28 (FIG. 1). The number of pulses contained in said counter at the end of said time interval subtracted from the arbitrarily determined number 128 will be representative of the axial position to which the movable element of adjustable focus lens 12 must be moved in order for subject 28 (FIG. 1) to be in focus at a particular image plane. This arrangement is functionally described in the block diagram of FIG. 3.

Figure 3:
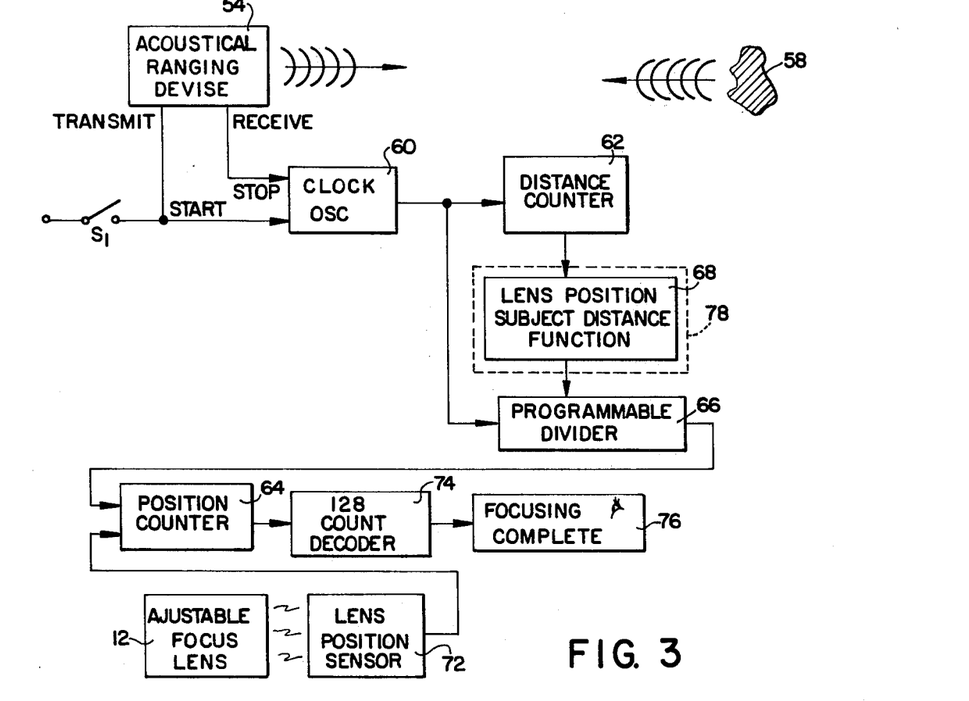
FIG. 3 is a functional block diagram of a coupled rangefinder and a portion of an adjustable focus lens focus control system, wherein that portion of said control system incorporating the lens/subject function is removable from said system.

FIG. 3 is a functional block diagram of a coupled rangefinder and that portion of an adjustable focus lens control system that takes into consideration the nonlinear relationship between the axial position of the movable element of an adjustable focus lens where a subject to be photographed is in focus at a particular image plane, and the distance from such a subject to said adjustable focus lens. The control system of which the control system in FIG. 3 forms a part, is described in greater detail in the above-mentioned SHENK applications. In FIG. 3, the closure of switch $S_1$ causes acoustical ranging device 54 to transmit a burst of ultrasonic energy toward object 58. At the same time, said closure of switch $S_1$ causes clock oscillator or pulse generator 60 to generate a stream of periodic pulses. The output of clock oscillator 60 is routed to and is counted by distance counter 62. Clock oscillator 60 continues to run until an echo of the previously transmitted acoustical energy is reflected from object 58 and is received by said acoustical ranging device 54. When such an echo is received by acoustical ranging device 54, it sends a stop signal to clock oscillator 60 which terminates the stream of periodic pulses being generated by said clock oscillator 60. At this point, the number of counts in counter 62 is representative of the distance between acoustical ranging device 54 and object 58. The stream of pulses from clock oscillator 60 which was routed to distance counter 62 was simultaneously routed to position counter 64 through programmable divider 66. Programmable divider 66 reduces the number of clock oscillator pulses routed to position counter 64 in accordance with the derivative or the slope of curve 52 (FIG. 2), said derivative or slope being permanently wired into or stored in lens position/subject function block 68. As a practical matter, lens/subject function block 68 makes several changes in the input/output or dividing ratio of programmable divider 66, said changes being dependent upon the number of counts in distance counter 62 as sensed by lens/subject function block 68. The points at which these changes occur are predetermined so that curve 52 (FIG. 2) will fit within the envelope defined by curves 48 and 50 (FIG. 2). These ratio change points are sometimes referred to as breakpoints and are designated reference numeral 70 in FIG. 2. There is a breakpoint for each piecewise linear portion of curve 52 in FIG. 1 and the divide ratio of programmable divider 66 remains constant between adjacent breakpoints. When the stream of pulses from clock oscillator 60 is terminated at the receipt of an echo by acoustical ranging device 54 as previously discussed, the number of pulses in position counter 64 that have been routed through and scaled down by programmable divider 66 subtracted from the number 128 are representative of the position to which the movable element of adjustable focus lens 12 must be moved in order to focus a sharp image of object 58 at a particular image plane. Once this number of counts is received by position counter 64, drive means (not shown) for positioning adjustable focus lens 12 to the correct subject-in-focus position, is enabled. The specific details of said drive means are described in the above-mentioned SHENK applications. When the movable element of adjustable focus lens 12 moves toward the correct subject-in-focus position, lens position sensor 72 senses said movement and generates pulses that are representative of the position of said movable adjustable focus lens 12 element. These lens position sensor 72 pulses are routed to and are counted by position counter 64. When the combined total of pulses in position counter 64 equals 128, 128 count decoder 74 generates focusing complete signal 76, said focusing complete signal 76 causing the movable element of adjustable focus lens 12 to be stopped at the correct subject-in-focus position. Refer to the above-mentioned SHENK applications for the specific details of how focusing complete signal 76 causes said movable element to be so stopped. Dashed rectangle 78 enclosing lens position/subject distance function block 68 indicates that said block 68 is capable of being readily removed from the automatic focus control system of FIG. 3. The state of the semiconductor art is such that the lens/subject function provided by block 68 can be included in a readily removable integrated circuit silicon device or chip. Such a device is functionally depicted in a portion of FIG. 4A.

Figure 4A:
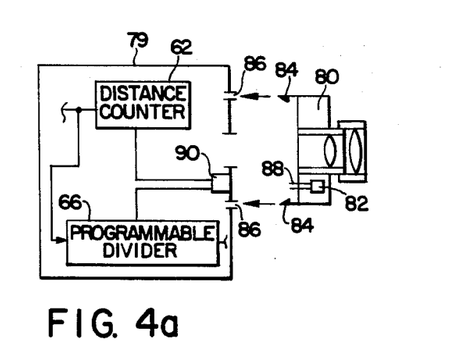
FIG. 4A depicts a camera with a demountable adjustable focus lens wherein the device for generating the lens/subject function in the control system of FIG. 3 is mounted in the housing of said lens for interconnection with said control system, when said lens is attached to said camera.

FIG. 4A depicts camera 79 with demountable adjustable focus lens 80 and electronic circuit 82 for generating the lens/subject function of said lens 80. Lens/subject function device 82 is mounted in the housing of said lens 80 for interconnection with the control system of FIG. 3 when said lens 80 is attached to said camera 79. When lens 80 is attached to camera 79, lens/subject function device 82 is substituted for lens/subject function block 68 in the control system of FIG. 3. To attach lens 80 to camera 79, fingers 84 projecting from the housing of adjustable focus lens 80 are inserted into openings 86 in camera 79. When said fingers 84 are so inserted, electrical connector pins 88 connected to device 82 and projecting from the housing of variable focus lens 80, connect with socket 90 in camera 79 which places device 82 electrically between distance counter 62 and programmable divider 66. When so positioned, the lens/subject function of adjustable focus lens 80 included in device 82 programs programmable divider 66 in accordance with said lens/subject function in the same manner that block 68, which includes the lens/subject function of adjustable focus lens 12, programs programmable divider 66 in FIG. 3.

Figure 4B:
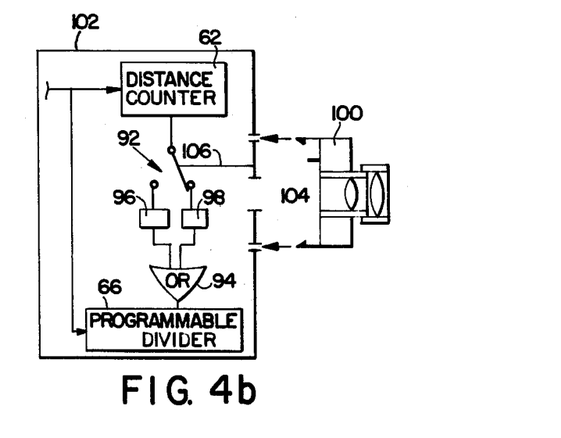
FIG. 4B depicts a camera with a demountable adjustable focus lens having a plurality of devices mounted in said camera for generating a lens/subject function wherein the appropriate lens/subject function generating device is selected by attaching said lens to said camera.

FIG. 4B depicts an alternate though less flexible embodiment of the inventive concept described with respect to FIG. 4A. In FIG. 4B, the distance counter 62 and programmable divider 66 components of the control system of FIG. 3 are depicted, said components functioning in the same manner as they do in said FIG. 3. Selectively connected between said distance counter 62 and programmable divider 66 by spring biased switch 92 and OR gate 94 are two electronic circuits 96 and 98, each of which contains a different lens/subject function. When adjustable focus lens 100 is attached to camera 102, in the same manner that adjustable focus lens 80 in FIG. 4A is attached to camera 79, lens/subject function 96, which is the lens/subject function of adjustable focus lens 100, is connected between distance counter 62 and programmable divider 66 as previously described. When adjustable focus lens 100 is so attached to camera 102, pin 104 projecting from the housing of adjustable focus lens 100 engages rod 106 in said camera 102 which actuates switch 92 to the position where lens/subject function device 96 is electrically connected between distance counter 62 and programmable divider 66. When adjustable focus lens 100 is removed from camera 102, spring biased switch 92 is actuated to the position where lens/subject function device 98 is electrically connected between distance counter 62 and programmable divider 66. Lens/subject function device 98 is for another adjustable focus lens (not shown) and said lens would not have a pin such as pin 104 projecting from it to actuate switch 92. In such a situation, switch 92 would remain in the physical position shown in FIG. 4B when said other adjustable focus lens is attached to camera 102. Either lens/subject function devices 96 or 98 would program programmable divider 66 in the same general manner than lens/subject function block 68 programs programmable divider 66 in FIG. 3. Each of said functions would be significantly different from each other and from the lens/subject function included in said block 68, however.

Figure 5:
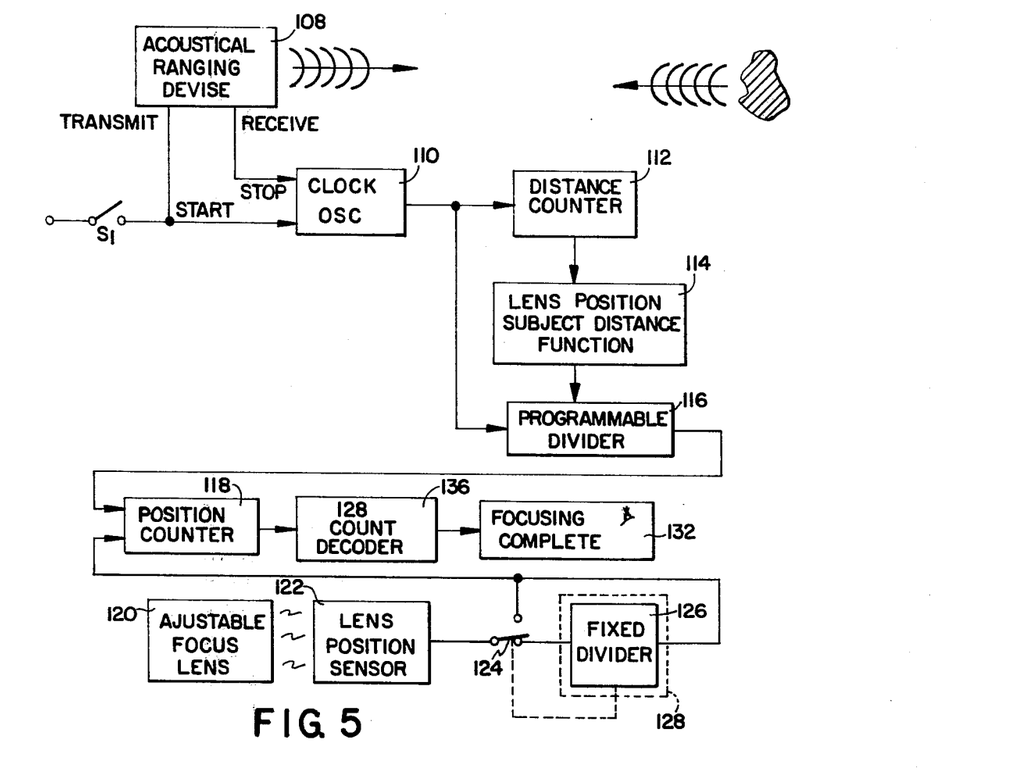
FIG. 5 is a functional block diagram of a coupled rangefinder and a portion of an adjustable focus lens focus control system for use with an adjustable and fixed focus lens wherein that portion of said control system generating a fixed focus lens scale factor is removable from said control system.

FIG. 5 is a functional block diagram of a coupled rangefinder and a portion of an adjustable focus lens control system for use with an adjustable and fixed focus lens similar to that depicted in FIG. 3. In FIG. 5, switch $S_1$, acoustical ranging device 108, clock oscillator 110, distance counter 112, lens position/subject distance function 114, programmable divider 116, and position counter 118 function in the same manner as switch $S_1$, acoustical ranging device 54, clock oscillator 60, distance counter 62, lens position/subject distance function 68, programmable divider 66 and position counter 64 in FIG. 3, respectively. In FIG. 5, the position of the movable element of adjustable focus lens 120 is sensed by lens position sensor 122, said lens position sensor 122 generating pulses that are representative of lens 120 position in the same manner that the position of lens 12 in FIG. 3 is sensed by lens position sensor 72. However, instead of the output from lens position sensor 122 being fed directly into position counter 118 as in FIG. 3, the output from lens positions sensor 122 is routed to position counter 118 through switch means 124 and fixed divider 126. Fixed divider 126 is enclosed by dashed block 128 to indicate that fixed divider 126 is readily removable from the control system of FIG. 5. When fixed divider 126 is connected to the control system of FIG. 5, switch means 124 is in the position shown and therefore pulses from lens position sensor 122 will be routed to position counter 118 through said fixer divider 126. However, when fixed divider 126 is removed from the control system of FIG. 5, the removal motion of fixed divider 126 from the control system of FIG. 5 will actuate switch 124 such that the output from lens position sensor 122 will be directly connected to position counter 118 through said switch 124. Fixed divider 126 is connected to the control system of FIG. 5 when a wide angle or teleconverter lens is combined with adjustable focus lens 120.

When a fixed focus lens having a magnification greater than one is combined with an adjustable focus lens such as adjustable focus lens 120 in FIG. 5, it is well known that said adjustable focus lens must be moved further along its principal image forming axis than it would be without such a fixed focus lens. In order to make an adjustable focus lens such as adjustable focus lens 120 in FIG. 5 move further than it would without the addition of a fixed focus lens, fixed divider 126 reduces the number of pulses being routed to position counter 118 from lens position sensor 122. Position counter 118 must count a total of 128 counts before 128 count decoder 130 will generate focusing complete signal 132 to terminate automatic focusing as previously discussed. Position counter 118 receives scaled pulses from clock oscillator 110 through programmable divider 116 whose number subtracted from 128 represents the position to which the movable element of adustable focus lens 120 must be moved in order to focus said adjustable focus lens 120 to the correct subject-in-focus position which was also previously discussed. The difference in the number of pulses between the pulses received from clock oscillator 110 and the number 128 are the number of pulses that must be generated by lens position sensor 122 without the addition of a fixed focus lens or are the number of pulses that must be generated by lens position sensor 122 as scaled down by fixed divider 126 when a fixed focus lens is combined with adjustable focus lens 120. It is a well-known fact that the amount of adjustable focus lens movement required along its principal image forming axis to focus a sharp image of a subject at a given image plane when optically combined with a fixed focus lens, is equal to the square of the magnification power of said fixed focus lens times the distance that said adjustable focus lens would have to so move without being so combined with said fixed focus lens. In accordance with the teachings of this embodiment of the present invention, fixed divider 126 having an input/output or divide ratio equal to the square of the magnfication power of a fixed focus lens is mounted on the housing of and is removable with said fixed focus lens. Such an arrangement is depicted in FIG. 6A.

Figure 6A:
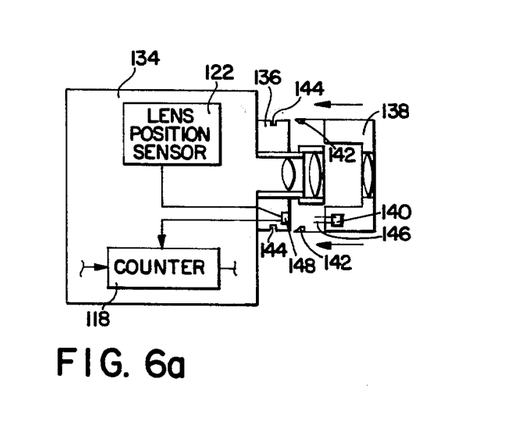
FIG. 6A depicts a camera with a demountable fixed focus lens wherein the device for generating the fixed focus lens scale factor in the control system of FIG. 5 is mounted in said lens for interconnection with said control system when said lens is attached to said camera.

FIG. 6A depicts camera 134 with adjustable focus lens 136 fixedly mounted on said camera 134. In addition, said camera 134 includes demountable fixed focus lens 138 having device 140 incorporating a conventional pulse divider circuit for dividing input pulses by a factor that is equal to the square of the magnification power of said fixed focus lens 138. Divider 140 is mounted on the housing for said lens 138 for interconnection with the control system of FIG. 5 when said lens 138 is attached to said camera 134. When lens 138 is attached to camera 134, divider device 140 is substituted for fixed divider 126 in the control system of FIG. 5. To attach lens 138 to camera 134, fingers 142 projecting from the housing of said lens 138 are pressed into openings 144 in the housing of adjustable focus lens 136. When said fingers 142 are so positioned, electrical connector pins 146 connected to divider device 140 and projecting from the housing of fixed focus lens 138 connect with socket 148 in the housing of adjustable focus lens 136 which places divider device 140 electrically between lens position sensor 122 and position counter 118. The nature of socket 148 is such that prior to the insertion of pins 146 into said socket 148, lens position sensor 122 is directly connected to position counter 118 through said socket 148. However, when divider device 140 is electrically connected between lens position sensor 122 and position counter 118, said divider device 140 divides the pulses being generated by lens position sensor 122 by a factor that is equal to the square of the magnification factor of fixed focus lens 138.

Figure 6B:
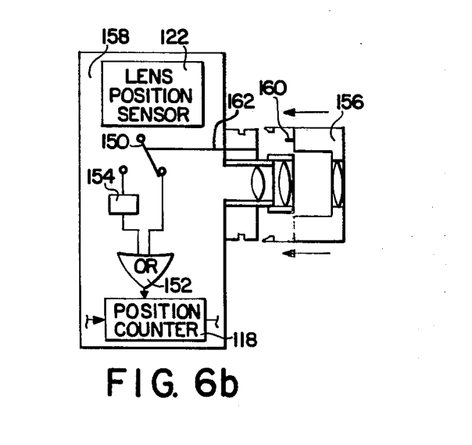
FIG. 6B depicts a camera with a demountable fixed focus lens having means for selecting the appropriate camera housing mounted fixed focus lens scale factor, said means being actuated by attaching said fixed focus lens to said camera.

FIG. 6B depicts an alternate, though less flexible embodiment of the inventive concept described with respect to FIG. 6A. In FIG. 6B, lens position sensor 122 and the position counter 118 portion of the control system of FIG. 5 are depicted. These components function in the same manner as they do in FIG. 5. Selectively connected between said lens position sensor 122 and position counter 118 by spring biased switch 150 and OR gate 152 is divider device 154. When fixed focus lens 156 is attached to camera 158, in the same manner that fixed focus lens 138 in FIG. 6A is attached to camera 134, divider device 154, which scales down input pulses by a ratio equal to the square of the magnification power of fixed focus lens 156, is connected between lens position sensor 122 and position counter 118 as previously described. When fixed focus lens 156 is so attached to camera 158, pin 160 projecting from the housing of fixed focus lens 156 engages rod 162 in said camera 158 which actuates switch 150 to the position where divider device 154 is electrically connected between lens position sensor 122 and position counter 118. When fixed focus lens 156 is removed from camera 158, spring biased switch 150 is actuated to the position where lens position sensor 122 is directly connected to position counter 118. With fixed focus lens 156 attached to camera 158, pulses generated by lens position sensor 122 must be divided or scaled down by a ratio equal to the square of the magnification factor of fixed focus lens 156 as previously discussed. Moreover, when fixed focus lens 156 is removed from camera 158, there is no need to scale down the pulses from lens position sensor 122 and, therefore, said lens position sensor 122 is directly connected to position counter 118 through switch 150 and OR gate 152 by the removal of fixed focus lens 156 from camera 158.

DISCUSSION

In describing the various embodiments of the present invention, the device that is either lens mounted or switched into the control system by attaching a lens to a camera has been described as a device that is capable of generating a lens/subject function or is capable of scaling down a series of periodic pulses by a fixed ratio.

Adjustable focus lens control system components described in, for example, FIGS. 3 and 5, such as the clock oscillator, counters, and programmable divider, etc., whether singly, collectively, or in any combination thereof could be included in the device that includes the lens/subject function or the device that includes the fixed divider as a design choice, or for design efficiency. Any such arrangement is contemplated by the inventive concept of the present invention.

Figure 7:
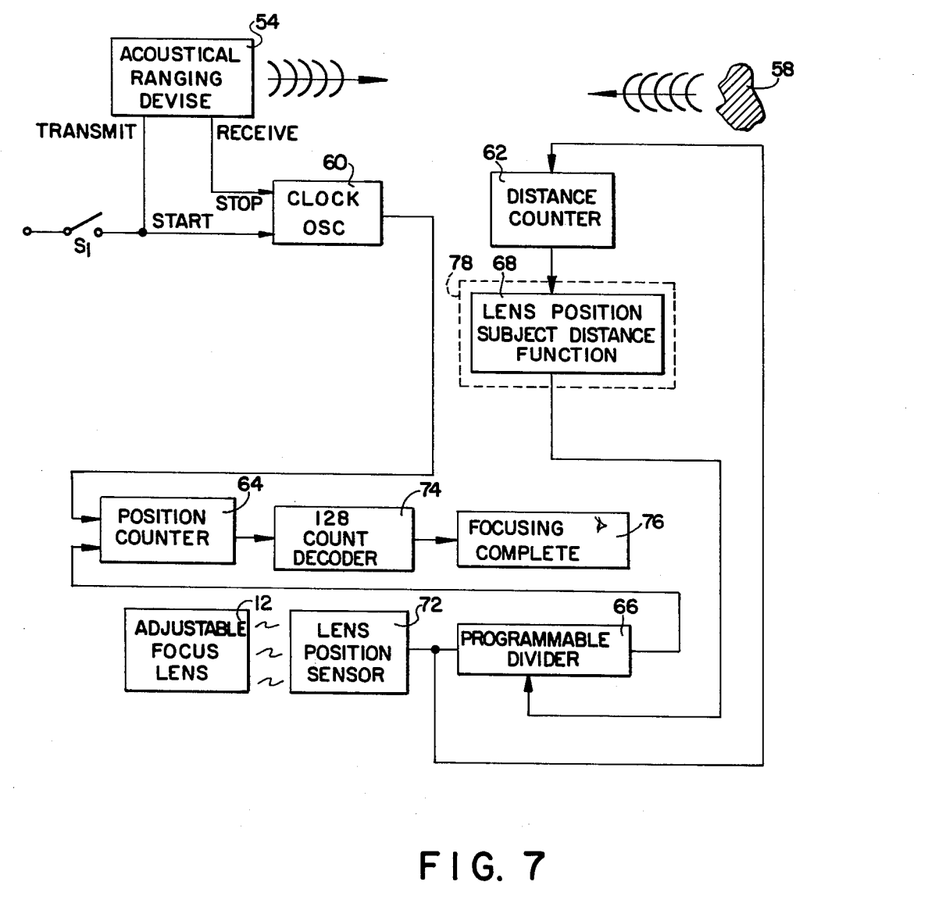
FIG. 7 is the same control system as that depicted in FIG. 3 except that the lens/subject function is located in the lens position feed back signal flow loop.

In FIG. 3, lens/subject function 68 causes programmable divider 66 to change the number of clock oscillator 60 pulses being routed to position counter 64 in accordance with the derivative or slope of the lens/subject function of adjustable focus lens 12 is previously discussed. However, the same positioning of adjustable focus lens 12 can be achieved by placing programmable divider 66 in the signal path that senses the actual position of the movable element of adjustable focus lens 12. This particular arrangement is shown in FIG. 7. In FIG. 7, clock oscillator 60 pulses are fed directly to position counter 64. When the distance to a remote object has been determined by acoustical ranging device 54, adjustable focus lens 12 is then positioned to the subject-in-focus position. As adjustable focus lens 12 moves toward said focus position, lens position sensor 72 would generate lens position pulses that would be routed to distance counter 62 and simultaneously routed to position counter 64 through programmable divider 66. With this arrangement, the pulses being routed to position counter 64 would be changed by programmable divider 66, distance counter 62 and lens position/subject distance block 68 in the same manner that these components change the pulses being routed to position counter 64 from clock oscillator 60 in FIG. 3.

Figure 8:
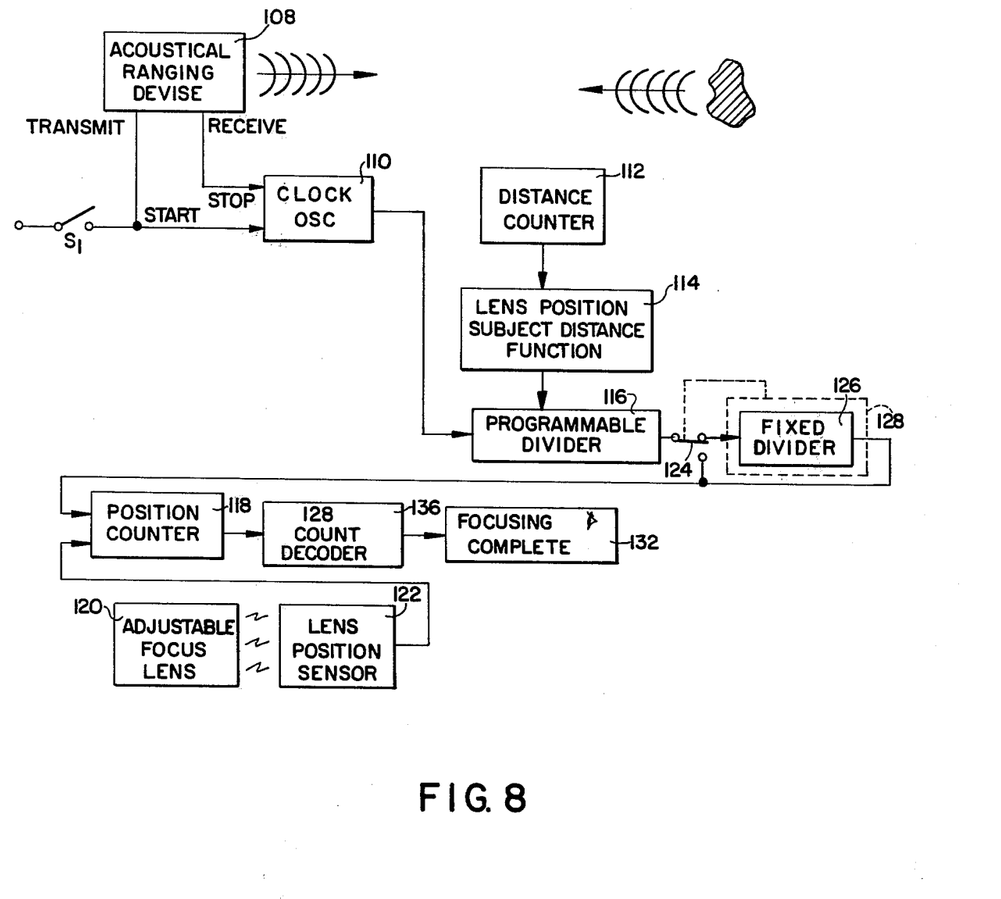
FIG. 8 is the same control system as that depicted in FIG. 5 except that the fixed divider is located in the feed forward signal flow loop.

In FIG. 5, fixed divider 126 scales down pulses from lens position sensor 122 by a fixed ratio in order to make adjustable focus lens 120 move a greater distance along its principal image forming axis when a fixed focus lens is attached to a camera incorporating the control system of said FIG. 5. The same degree of adjustable focus lens 120 movement could be achieved by inserting fixed divider 126 between programmable divider 116 and position counter 118 rather than between lens position sensor 122 and said position counter 118. Such an arrangement is depicted in FIG. 8. In this arrangement, position counter 118 would receive less pulses from programmable divider 116 and, therefore, adjustable focus lens 120 would have to move further in order to produce the total of 128 counts required by 128 count decoder 130 so that it can generate focus complete signal 132. With the exception of the just-described position of fixed divider 126 and the particular pulses that it divides when connected into the control system by switch means 124, the control systems depicted in FIGS. 5 and 8 function in the same manner to position the movable element of adjustable focus lens 12.

It should be noted that fixed divider 126 was included in the control systems of FIGS. 5 and 8 because it was assumed that the fixed focus lens to be combined with adjustable focus lens 120 had a magnification power greater than one. However, if the magnification power was less than one, fixed divider 126 would then become a fixed multiplier.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. In an auto-focus camera of the type alternatively employing interchangeable lens assemblies, said camera having means when energized for deriving an electrical range signal having a given functional relation to subject distance,
   means for alternatively mounting a multi-element adjustable lens assembly, each having at least one lens portion thereof movable for focusing an image of the subject on a recording medium, the movable lens portions of at least some of said lens assemblies having differing lens-subject functions relating lens focal position to subject distance;
   drive means for adjusting the movable lens portion of a mounted lens assembly; and
   an electrical focus control circuit for controlling the operation of said drive means in accordance with said range signal and the lens-subject function of a mounted lens assembly to position the movable lens portion thereof at a focal position wherein the image of the subject is focused on said recording medium, said electrical focus control circuit including means for converting said range signal to a lens position parameter in accordance with said lens-subject function and for controlling said drive means to displace the movable lens portion of said mounted lens assembly to a position in accordance with said lens position parameter, the improvement wherein each said lens assembly carries an electrical circuit portion of said converting means to alter said resulting lens position parameter in accordance with the lens-subject function of said mounted lens assembly, and means for coupling said lens carried electrical circuit portion to said camera when each such interchangeable lens assembly is mounted thereon.

2. In a photographic camera of the type having:
   means for selectively coupling said camera to a source of energy;
   a camera housing;
   a film plane located within said camera housing;
   a lens housing demountably attached to said camera housing;
   an adjustable focus lens having at least one movable lens element, said lens being mounted on said lens housing and having a particular nonlinear relationship between the subject-in-focus position of said lens element and the distance to subjects within the focusing range of said lens, for forming images of subjects positioned within said focusing range at said film plane;
   means for deriving an electrical signal representative of the actual distance between said camera and a subject remote therefrom;
   means including an electrical circuit for positioning said adjustable focus lens element to the proper subject-in-focus position in accordance with said electrical subject distance signal, said positioning means including an electrical circuit portion that makes the position to which said lens element is positioned dependent upon the lens position/subject distance function of said adjustable focus lens,
   the improvement comprising:
   that said electrical circuit portion of said lens element positioning means that makes the position to which said lens element is positioned dependent upon the lens position/subject distance function of said adjustable focus lens, is mounted on and is removable with said lens housing when said lens housing together with its said adjustable focus lens are demounted from said camera housing; and means for interconnecting said electrical circuit portion with said lens element positioning means when said lens housing is mounted on said camera housing.

3. In a photographic camera of the type having:

means for selectively coupling said camera to a source of energy;

a camera housing;

a film plane located within said camera housing;

a lens housing demountably attached to said camera housing;

an adjustble focus lens having at least one movable lens element, said lens being mounted on said lens housing and having a particular nonlinear relationship between the subject-in-focus position of said lens element and the distance to subjects within the focusing range of said lens, for forming images of subjects positioned within said focusing range at said film plane;

means for positioning said adjustable focus lens to the proper subject-in-focus position, said lens positioning means including:

means for deriving an electrical signal representative of the actual distance between said camera and a subject remote therefrom;

means for generating an electrical signal representative of the focus position of said movable lens element of said adjustable focus lens;

an electrical circuit responsive to said subject distance signal for generating a signal representative of said nonlinear lens element position/subject distance relationship;

means responsive to said lens element focus position signal and to said nonlinear lens element position/subject distance relationship signal for generating a signal representative of the position to which said lens element must be moved to focus an image of a particular subject at said film plane; and drive means, responsive to said signal representative of the position to which said lens element must be moved to focus said subject at said film plane, for focusing said lens element at the appropriate subject-in-focus position;

the improvement comprising:

that a portion of said electrical circuit for generating said signal representative of said nonlinear lens element position/subject distance relationship is mounted on and is demountable with said lens housing when said lens housing together with said adjustable focus lens are demounted from said camera housing; and means for interconnecting said electrical circuit portion with said lens element positioning means when said lens housing is mounted on said camera housing.

4. In a photographic camera of the type having:

means for selectively coupling said camera to a source of energy;

a camera housing;

a film plane located within said camera housing;

a lens housing demountably attached to said camera housing;

an adjustable focus lens having at least one movable lens element, said lens being mounted on said lens housing and having a particular nonlinear relationship between the subject-in-focus position of said lens element and the distance to subjects within the focusing range of said lens, for forming images of subjects positioned within said focusing range at said film plane;

means for positioning said adjustable focus lens to the proper subject-in-focus position, said lens positioning means including:

means for deriving an electrical signal representative of the actual distance between said camera and a subject remote therefrom;

means for generating an electrical signal representative of the focus position of said movable lens element of said adjustable focus lens;

an electrical circuit responsive to said lens element position signal and said subject distance signal for generating a signal representative of said nonlinear lens element position/subject distance relationship;

means responsive to said subject distance signal and to said nonlinear lens element position/subject distance relationship signal for generating a signal representative of the position to which said lens element must be moved to focus an image of a particular subject at said film plane; and drive means, responsive to said signal representative of the position to which said lens element must be moved to focus said subject at said film plane, for focusing said lens element at the appropriate subject-in-focus position;

the improvement comprising:

that a portion of said electrical circuit for generating said signal representative of said nonlinear lens element position/subject distance relationship is mounted on and is demountable with said lens housing when said lens housing together with said adjustable focus lens are demounted from said camera housing; and means for interconnecting said electrical circuit portion with said lens element positioning means when said lens housing is mounted on said camera housing.

5. In an auto-focus camera having energizeable means for deriving an electrical range signal having a given functional relation to subject distance;

energizeable means for driving a moveable portion of a mounted camera lens assembly having a first lens-subject function relating the focal position of the moveable lens portion to subject distance, and an electrical focus control circuit for controlling the operation of said drive means in accordance with said electrical range signal and said lens-subject function, to position said moveable lens portion to a focal position wherein the image of a subject is focused on a recording medium within said camera, said electrical focus control circuit including a first converting means for converting said electrical range signal to a lens parameter in accordance with said lens-subject function and means for controlling said energizeable drive means to displace the moveable lens portion of said mounted lens assembly to a focus position in accordance with said lens parameter; and means for releasably mounting at least a lens element resulting in a second lens-subject function different from said first lens-subject function, the improvement wherein said electrical focus control circuit includes a second converting means for converting said electrical range signal to a second lens parameter in accordance with said second lens-subject function, and switching means for interchanging said second converting means in said focus control circuit with said first converting means such that said focus control circuit controls the displacement of said moveable lens element in accordance with said second lens-subject function and not in accordance with said first lens-subject function, said switching means being responsive to the mounting of said lens element.

6. A photographic camera comprising:
means for selectively coupling said camera to a source of energy;
a camera housing;
a film plane located within said camera housing;
an adjustable focus lens housing demountably attached to said camera housing;
an adjustable focus lens having at least one movable lens element, said lens being mounted on said lens housing and having a particular nonlinear relationship between the subject-in-focus position of said lens element and the distance to subjects within the focusing range of said lens, for forming images of subjects positioned within said focusing range at said film plane;
a fixed focus lens having a fixed focus lens housing, said fixed focus lens housing being demountably attached to said camera, said fixed focus lens having its optical axis coincidently aligned with the optical axis of said adjustable focus lens;
means for deriving an electrical signal representative of the actual distance between said camera and a subject remote therefrom;
drive means for positioning said adjustable focus lens element to the proper subject-in-focus position in accordance with said electrical subject distance signal; and
means for changing the position to which said adjustable focus lens element is focused by said drive means, by a fixed ratio, said fixed ratio changing means being interconnected with said drive means when said fixed focus lens housing is attached to said camera.

7. A photographic camera as defined in claim 6, wherein said means for varying the position to which said adjustable focus lens is focused by said focusing means by a fixed ratio is mounted on said fixed focus lens housing and is removable with said fixed focus lens 8. The camera of claim 7 wherein said fixed ratio is greater than one.

9. The camera of claim 7 wherein said fixed ratio is less than one.

10. The camera of claim 7 wherein said ratio is equal to the square of the magnifying power of said fixed focus lens.

11. A photographic camera comprising:
means for selectively coupling said camera to a source of energy;
a camera housing;
a film plane located within said camera housing;
a lens housing demountably attached to said camera housing;
an adjustable focus lens having at least one movable lens element, said lens being mounted on said lens housing and having a particular nonlinear relationship between the subject-in-focus position of said lens element and the distance to subjects within the focusing range of said lens, for forming images of subjects positioned within said focusing range at said film plane;
a fixed focus lens having a fixed focus lens housing, said fixed focus lens housing being demountably attached to said camera, said fixed focus lens having its optical axis coincidently aligned with the optical axis of said adjustable focus lens; and
means for positioning said adjustable focus lens to the proper subject-in-focus position, said lens positioning means including:
means for deriving an electrical signal representative of the actual distance between said camera and a subject remote therefrom;
means for generating an electrical signal representative of the focus position of said movable lens element of said variable focus lens;
an electrical circuit for generating a signal that varies from said lens element focus position signal by a fixed ratio;
an electrical circuit responsive to said subject distance signal for generating a signal representative of said nonlinear lens element position/subject distance relationship; and
drive means responsive to said nonlinear lens element position/subject distance signal and to said varied lens element focus position signal when said fixed focus lens is attached to said camera and responsive to said nonlinear lens element position/subject distance signal and to said lens element focus position signal but not responsive to said varied lens element focus position signal when said fixed focus lens is detached from said camera, for positioning said movable lens element to the proper subject-in-focus position.

12. A photographic camera as defined in claim 11 wherein a portion of said electrical circuit for varying the position to which said adjustable focus lens is focused by said lens positioning means by a fixed ratio, is mounted on said fixed focus lens housing, is removable with said fixed focus lens, and is interconnected with said lens positioning means when said fixed focus lens is attached to said camera.

13. The camera of claim 12 wherein said fixed ratio is greater than one.

14. The camera of claim 12 wherein said fixed ratio is less than one.

15. The camera of claim 12 wherein said ratio is equal to the square of the magnifying power of said fixed focus lens.

16. A photographic camera comprising:
means for selectively coupling said camera to a source of energy;
a camera housing;
a film plane located within said camera housing;
a lens housing demountably attached to said camera housing;
an adjustable focus lens having at least one movable lens element, said lens being mounted on said lens housing and having a particular nonlinear relationship between the subject-in-focus position of said lens element and the distance to subjects within the focusing range of said lens, for forming images of subjects positioned within said focusing range at said film plane;

a fixed focus lens having a fixed focus lens housing, said fixed focus lens housing being demountably attached to said camera, said fixed focus lens having its optical axis coincidently aligned with the optical axis of said adjustable focus lens; and means for positioning said adjustable focus lens to the proper subject-in-focus position, said lens positioning means including:

means for deriving an electrical signal representative of the actual distance between said camera and a subject remote therefrom;

means for generating an electrical signal representative of the focus position of said movable lens element of said adjustable focus lens;

an electrical circuit for generating a signal that varies from said lens element focus position signal by a fixed ratio;

an electrical circuit responsive to said lens element position signal and said subject distance signal for generating a signal representative of said nonlinear lens element position/subject distance relationship; and drive means responsive to said nonlinear lens element position/subject distance signal and to said varied lens element focus position signal when said fixed focus lens is attached to said camera and responsive to said nonlinear lens element position/subject distance signal and to said lens element focus position signal when said fixed focus lens is detached from said camera, for positioning said movable lens element to the proper subject-in-focus position.

17. A photographic camera as defined in claim 16 wherein a portion of said electrical circuit for varying the position to which said adjustable focus lens is focused by said lens positioning means by a fixed ratio, is mounted on said fixed focus lens housing, is removable with said fixed focus lens, and is interconnected with said lens positioning means when said fixed focus lens is attached to said camera.

18. The camera of claim 17 wherein said fixed ratio is greater than one.

19. The camera of claim 17 wherein said fixed ratio is less than one.

20. The camera of claim 17 wherein said ratio is equal to the square of the magnifying power of said fixed focus lens.

* * * * *